United States Patent [19]
Korpel

[11] 3,988,532
[45] Oct. 26, 1976

[54] ARRANGEMENT FOR COMPENSATING DUTY FACTOR VARIATIONS IN AN OPTICAL VIDEO DISC

[75] Inventor: Adrianus Korpel, Prospect Heights, Ill.

[73] Assignee: Zenith Radio Corporation, Chicago, Ill.

[22] Filed: Apr. 2, 1975

[21] Appl. No.: 564,389

[52] U.S. Cl. .................. 178/6.6 DD; 178/6.6 DC; 178/6.6 TC; 179/100.3 V; 360/36; 360/38
[51] Int. Cl.² .................. H04N 5/76; G11B 7/00
[58] Field of Search ...... 178/6.6 R, 6.6 TC, 6.6 DD, 178/6.6 DC, 6.7 A; 179/100.3 V; 358/4, 8; 360/27, 28, 24, 25, 29, 30, 36, 38

[56] References Cited
UNITED STATES PATENTS

| | | | |
|---|---|---|---|
| 3,571,526 | 3/1971 | Stockwell | 360/24 |
| 3,893,168 | 7/1975 | Bechley et al. | 358/8 |
| 3,906,152 | 9/1975 | Hoogendisk | 178/6.7 A |

*Primary Examiner*—Raymond F. Cardillo, Jr.
*Attorney, Agent, or Firm*—Cornelius J. O'Connor

[57] ABSTRACT

Processing optical video discs may result in modulation of the duty factor of the pits and lands which constitute a spatial representation of a stored carrier signal frequency modulated with program information. Such modulation of duty factor introduces spurious components that are detrimental to image reproduction if the frequency of the stored carrier signal is not at least twice the highest video frequency component to be reproduced. A correction signal is developed and used to at least partially cancel the effect of such spurious components.

2 Claims, 4 Drawing Figures

ARRANGEMENT FOR COMPENSATING DUTY FACTOR VARIATIONS IN AN OPTICAL VIDEO DISC

BACKGROUND OF THE INVENTION

Video disc systems are known in which a video program is recorded or stored for playback through a television receiver in a process which is generally similar to the playback of audio records. While such systems may operate on a variety of different principles, the optical system is of particular interest with respect to the present invention which will be described in that environment.

One form of video disc for the optical system has a succession of pits alternating with lands usually in a multiturn spiral storage track with the pits and lands of such varying dimension along the length of the track as to collectively constitute a spatial representation of a carrier signal frequency modulated with program information. The program generally includes luminance, chroma, synchronizing and audio information. Scanning of the storage track with a reading beam of energy effects modulation of the beam so that its impingement upon a photoreceptor develops a frequency modulated carrier wave signal conveying the information stored in the disc. It is of course known that the reading or playback system may operate in the transmissive mode in which case the record is transmissive to the reading beam and the pits serve as a diffraction pattern to modulate the beam as it passes through the disc. Alternatively, the playback may function in the reflective mode which is generally similar except that in this case the reading beam, instead of passing through the disc, is reflected therefrom to a suitably positioned photoreceptor.

Experience has shown that the pits and lands frequently suffer a length distortion so that dimensionally they do not have the 50% duty factor required accurately to match or represent the modulated carrier signal under the control of which these elements are formed in the process of storing information in the disc. This may be likened to a modulation in duty cycle or an unintended and undesired incremental variation in the length of such elements measured along the storage track. Most generally, the pit length suffers an increase but whether the duty factor is increased or decreased its effect is to introduce a band of spurious components into the base band of the output signal derived from reading the disc. Where the nominal frequency of the frequency modulated carrier signal utilized in storing information in the disc is at least twice the highest video frequency component desired to be reproduced, the spurious signal content attributable to undesired modulation of duty factor can be eliminated by filtering. On the other hand, if the carrier frequency is less than twice the highest video component, the band of spurious signal components attributable to duty factor modulation overlaps and occasions interpenetration with the lower sideband components of the carrier signal derived from reading the disc. In such a case, the spurious components can no longer be avoided by filtering and they tend to introduce imperfections in image reproduction.

One might suppose that the air would always choose a carrier frequency to facilitate obviating imperfections in image reproduction caused by duty factor modulation or error except that there are desired advantages in operating the system with low values of carrier frequency. It is found, for example, that with lower carrier frequencies there is a less stringent resolution requirement because of the increased spatial wave length and also the depth of focus may be increased since that parameter is related to spot size. And finally, the optical system with its tracking arrangement and optical components may be less expensive and more practical when designed for lower carrier frequencies.

OBJECTS OF THE INVENTION

Accordingly, it is an object of the invention to provide an arrangement which reduces or at least partially eliminates the effect of spurious components encountered because of duty factor error in a video disc playback system.

It is a specific object of the invention to arrange a feedback system which, in effect, cancels spurious components that may be introduced in the output signal of an optical playback system as a consequence of duty factor error.

SUMMARY OF THE INVENTION

The invention relates to an optical playback system for reading out information stored in the form of a track on a video record. Such a track comprises a succession of alternating pits and lands which collectively constitute a spatial representation of a carrier signal which has a frequency less than twice the highest video frequency. The carrier is frequency modulated by a baseband signal comprising a band of video components and by at least one other component that is unrelated to video information had has a frequency less than the lowest frequency in the modulated spectrum. The pits and lands, under a condition of duty factor error, are further representative of a band of spurious components related to the video components and of a counterpart component related to the aforesaid other component and overlapping a lower sideband of the carrier signal. An arrangement for effectively eliminating the band of spurious components comprises a photodetector responsive to a reading of the record track with a beam of light energy to develop an output signal representative of the modulated carrier and also representative of the band of spurious components when duty factor error is present. There are means coupled to the output of the photodetector for deriving the counterpart component plus a detector, also coupled to the photodetector output, for demodulating the carrier signal. A frequency selector coupled to the detector output derives the aforesaid other component. A synchronous detector, responsive to the counterpart component and to the other component, develops an error signal having a polarity and amplitude proportional to the duty factor error. A wave shaping means is coupled to the output of the detector to alter the configuration of a portion of the detected baseband signal to simulate the band of spurious components. A controllable gain means, responsive to the error signal and to the simulated signal, develops a feedback signal having a polarity and an amplitude effective to cancel the band of spurious components. Finally, means are provided for coupling the feedback signal to the output of the photoreceptor to substantially eliminate the spurious components from the output signal.

BRIEF DESCRIPTION OF THE DRAWINGS

The features of the invention believed to be novel are set forth with particularity in the appended claims. The invention, together with further objects and advantages thereof, may best be understood by reference to the following description taken in conjunction with the accompanying drawings in the several figures of which like reference numerals identify like elements and in which:

DESCRIPTION OF THE PREFERRED EMBODIMENT

Figure 1:
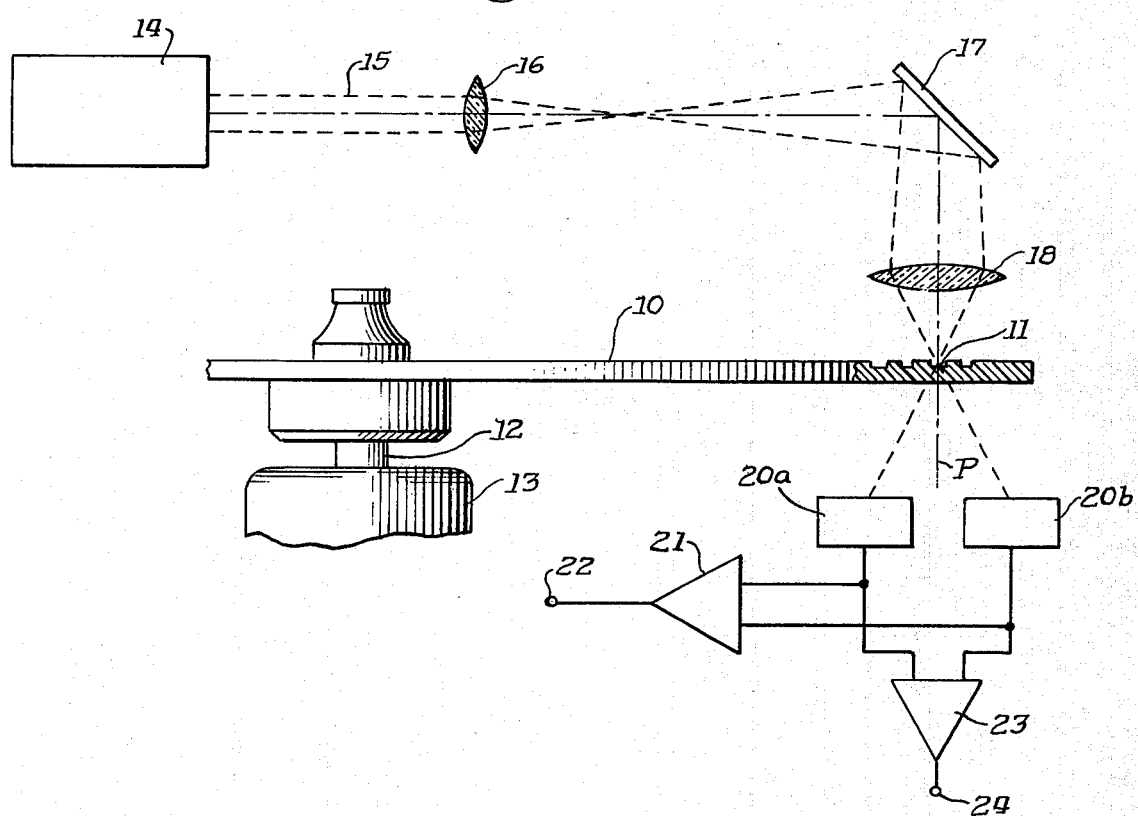
FIG. 1 is a schematic representation of an optical video playback system with which the invention may advantageously be employed.

The optical playback system of FIG. 1 reads out information stored in a record or video disc 10 of suitable material, such as polyvinyl chloride, which has the capability of storing program information. The information is stored in a multiturn spiral shaped track 11 formed on one surface of the disc as a succession of cavities or pits and a like succession of lands which alternate with the pits to the end that they collectively constitute a spatial representation of a carrier signal frequency modulated by program information. Disc 10 with the program information is a replica of a master carefully constructed to store the program and utilized in a replicating process.

The master may be a glass disc which is coated with a photoresist material to respond to actinic energy, such as a laser beam, controlled by a carrier signal which is frequency modulated with the program information. The laser is scanning the master in a spiral pattern, while it is modulated by the program bearing carrier signal, develops elemental areas of the coating that are soluble in a known solvent as well as intervening elemental areas that are insoluble. Development of the master after exposure to the modulated laser beam produces a storage track having pits and lands constituting a spatial representation of the frequency modulated carrier signal. Of course, the replicating process causes disc 10 to have a similar storage track of pits and lands.

Usually the program information borne by the carrier signal includes luminance information in the form of a band of video components, chroma information in the form of an amplitude and phase modulated subcarrier and at least synchronizing information. One or more subcarriers modulated with audio may also be included. It is convenient to arrange the constituent parts of the program in accordance with the NTSC format to be used directly in preparing the master. Alternatively, the constituent parts of the program may have specifically different but related frequency assignments to those found in the NTSC format so that simple transcoding permits ready conversion from one for the other.

Disc 10 may be of sufficient thickness to be mechanically rigid in which case it may be given a conductive coating to operate in the reflective mode and supported upon a turntable in the playback apparatus. Alternatively, and as indicated in FIG. 1, the disc may be so thin as to be flexible in which case it may be suported on a spindle 12 and driven by a motor 13 which rotates the spindle and disc at a relatively high speed, of the order of 1800 rpm, to accomplish what is referred to as flying the disc. Since the record track is a spatial representation of the frequency modulated carrier wave signal under the control of which the track has been prepared, reading of the track with a laser or light beam develops a correspondingly modulated carrier wave signal. The means for scanning the track comprises a laser source 14 which projects a beam 15 of monochromatic light through an intermediate lens 16 and, by way of a mirror 17 to a final or objective lens 18 which focuses the beam onto the segment of track 11 instantaneously occupying the reading position. While not shown in the drawing, mirror 17 is frequently supported for controlled displacement about two orthogonally related axes to correct errors that are usually encountered in such a system. One of these has to do with radial tracking and the other with timing.

Since there is no mechanical coupling of the reading beam with the video disc, it is necessary to provide some means for maintaining the beam in radial tracking registration with the storage track. Servo systems for accomplishing that result are known in the art. They develop an error signal which has a polarity designating the direction of radial misregistration and an amplitude related to the degree of misregistration. That signal is employed to accomplish controlled displacement of mirror 17 about the axis which determines the radial position of beam 15.

Timing errors are attributable to eccentricities or deformations of the disc and may be corrected by controlled displacement of the beam in the proper direction along a path that is tangential to the storage track at the place where it is read by beam 15. Here again an error signal is required and is usually obtained by providing a pilot signal on the disc which may be read out and supplied to a phase detector which also receives a phase reference signal and, in response thereto, develops a second error signal having a polarity and amplitude related to the sense and extent of the timing error. It is used to displace mirror 17 in an orthogonal direction to that relied on for radial correction.

Servo systems necessary for radial and timing corrections constitute no part of the present invention and, simply for convenience, have not been illustrated in the drawing.

In order to track the disc and read out all segments of its storage track, it is necessary that the reading spot be moved radially over the disc at an appropriate speed. This, too, is well understood in the art and has been omitted from the drawing for the sake of simplifying the schematic representation.

Most frequently, flexible optical discs are transmissive to the reading beam and this has been assumed to be the case in the arrangement of FIG. 1. Accordingly, there are photo-receptor means 20a and 20b positioned on the side of the disc opposite that from which the reading beam approaches. The photoreceptor is indicated as simply a pair of photocells aligned with one another on opposite sides of a reference plane P which is perpendicular to the diameter of disc 10 and tangent to the track at the point of the reading spot. This is a very simple light pick-up arrangement and may be replaced by a matrix of four photocells similarly displaced relative to the reference plane as two pairs on opposite sides of that plane and with the elements of each pair displaced from reference plane P in the direction of the storage track. For the simple two cell case, the outputs of the photocells are combined additively in a summing amplifier 21 to deliver to an output terminal 22, in response to scanning of the record, a carrier wave signal frequency modulated with the same program information employed in preparing the master from which disc 10 has been derived. The outputs of the photocells are differently combined in another amplifier 23 to make available at a second output terminal 24 a radial error correction signal. Obviously, amplifier 23 would be included in the radial servo loop which, as explained above, has been omitted from the drawing. A particularly effective matrix of four photocells is described and claimed in a copending application, Ser. No. 519,897, filed Nov. 1, 1974, in the name of Robert Adler and John Rennick and assigned to the assignee of the present invention.

Figure 2:
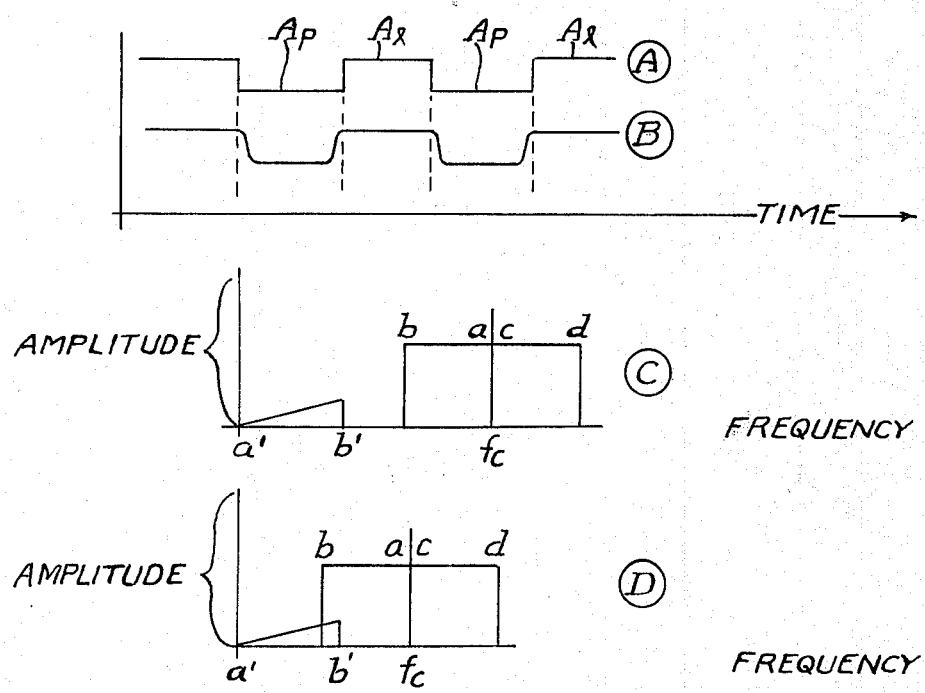
FIG. 2 contains curves used in explaining duty factor error and its consequence in an optical video system.

Curve A of FIG. 2 is a rectangular waveform that may represent the frequency modulated carrier signal employed to control the laser used in mastering and, for ideal conditions, further represents pits $A_p$ and the intervening lands $A_l$ which constitute the storage track of disc 10. Where this optimum condition is satisfied, the system in FIG. 1 delivers to output terminal 22 an accurate replica of the program modulated signal used to control the laser in mastering and that signal is suitable for application to a color television receiver, for example, to obtain image reproduction. In practice, however, such ideal conditions are seldom met and the shape of the storage track segment is more nearly like the representation in Curve B. The construction lines extending between Curves A and B reflect one possible difference between the intended waveform of Curve A and the actual track contour pressed on the record and represented by Curve B. It will be observed that the leading edges of the pits appear to have been delayed and their trailing edges appear to have been advanced, providing a change or reduction in duty factor and, therefore, a condition referred to as duty factor error. A number of reasons account for this possible distortion such as incomplete exposure of the photoresist in the mastering process and memory effects or cold-flow phenomenon of the disc material.

In the presence of duty factor error the signal output of the photoreceptor in the playback apparatus will have an amplitude-frequency characteristic of the type shown by the curves of FIGS. 2C or 2D, depending upon the relationship of the nominal frequency of the frequency modulated carrier in relation to the highest video frequency component to be reproduced. In FIG. 2C, for example, the carrier signal $f_c$ has a lower modulation sideband $a - b$ and an upper modulation sideband $c - d$. It is only this modulated signal that is developed in the photoreceptor for the optimum case having no duty factor error but where such error is experienced there are also present spurious signals within the band $a' - b'$. The band of spurious components has a general correspondence to the band of video components modulated on carrier $f_c$ and extending from zero to an upper frequency $b'$ such that the extremities of the range $a' - b'$ are related to the desired band of components $a - b$ respectively. The spectrum of spurious components has a triangular amplitude-frequency characteristic with a slope of 6 db/octave because the amplitude of any component within the spurious band is weighted by a factor proportional to that frequency. Moreover, it may be shown that the amplitude of the spurious components is proportional, both in sign and magnitude, to the percentage error in duty cycle.

The frequency relationships of FIG. 2C apply where the carrier frequency $f_c$ exceeds twice the frequency $b$ of the highest video frequency component desired to be reproduced. In such a case filtering is effective to eliminate the band of spurious components, confining the output signal of the player to the desired carrier $f_c$ and its modulation sidebands.

In the frequency spectrum of FIG. 2D, however, the carrier frequency $f_c$ is less than twice the frequency of the highest video component to be reproduced. Consequently, there is interpenetration between the modulation sidebands of the desired carrier signal and the band of spurious components attributable to duty factor error. Filtering can not now be resorted to in order to eliminate the spurious components completely and utilizing the output of the video player in the presence of interpenetration of these bands occasions impairment of the reproduced image.

Figure 3:
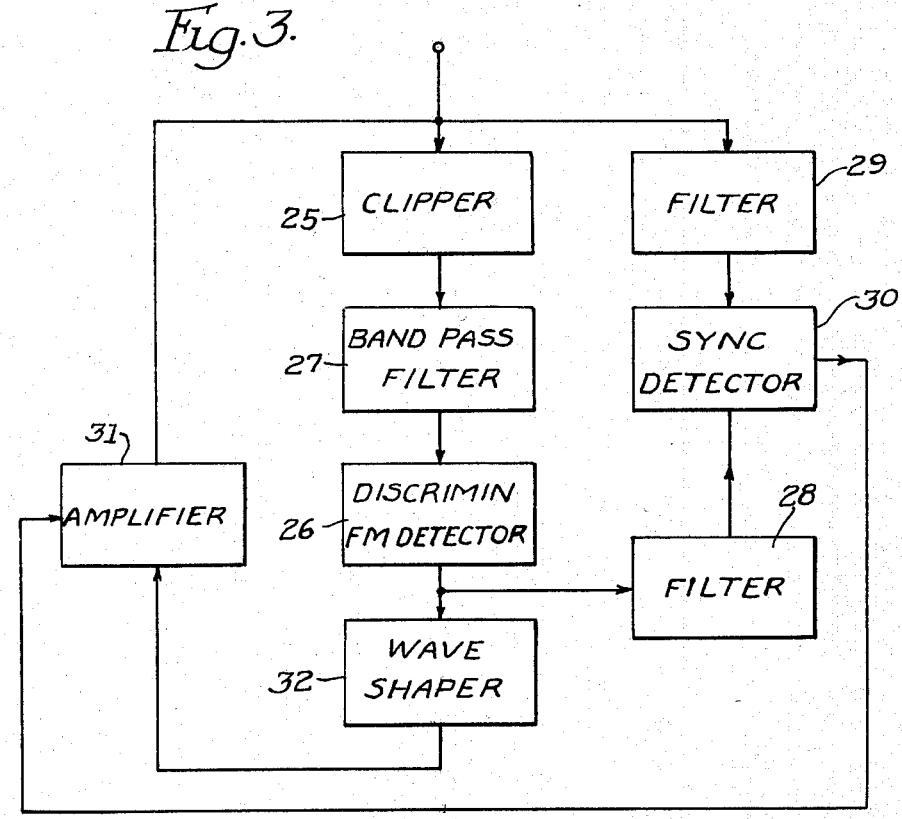
FIG. 3 is a block diagram of an arrangement constructed in accordance with the invention to compensate for duty factor error; while FIG. 4 comprises response-frequency characteristics employed in explaining the operation of the arrangement of FIG. 3.
Figure 4:
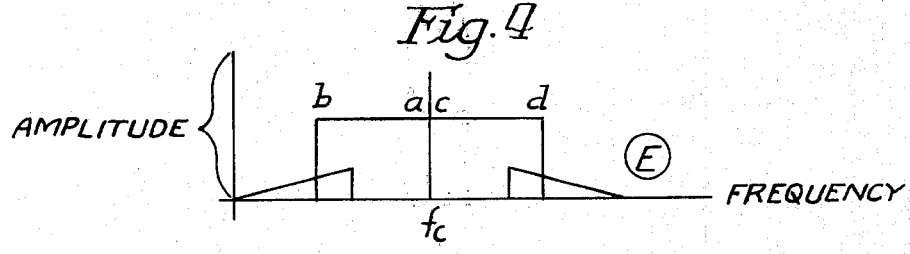
Figure 4:
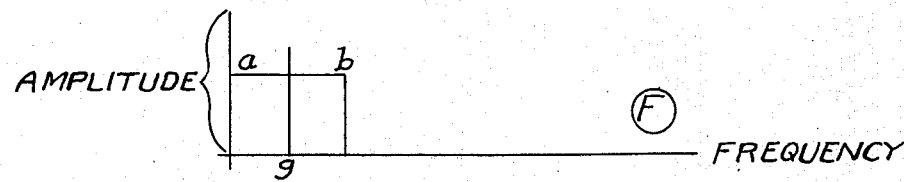
Figure 4:
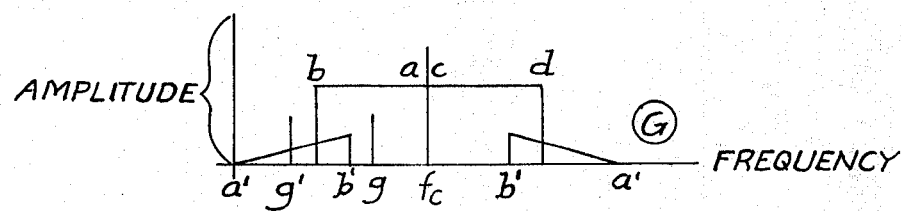

The present invention, recognizing that duty factor error may cause scanning of the pits and lands of the storage track to produce an output signal representative not only of the desired program information but also of the described spurious band of components, teaches how to compensate or at least partially cancel the unwanted spurious components. It proceeds on the premise that the characteristic of FIG. 2D applies and that the spectrum involved includes the band $a' - b'$ of spurious components overlapping the lower modulation sidebands $b - a$ of the modulated carrier $f_c$. This characteristic is idealized in that the modulation sidebands are shown with equal amplitude and further in the usual case the optical player has a limited frequency bandwidth capability and generally translates the carrier $f_c$ with its lower sideband but only a segment of its upper sideband $c - d$. The output of the photoreceptor is usually supplied to a clipper 25 as indicated in FIG. 3. The effect of clipping, as reflected in the characteristic of FIG. 4E is to restore the upper sideband or, in effect, create a mirror image of the lower sideband of the carrier, producing the spectrum illustrated, even though bandwidth limitations otherwise suppress a significant segment of the upper modulation sideband of carrier $f_c$. In other words, the signal represented in FIG. 4E is supplied to a discriminator and FM detector 26, through a band pass filter 27 which eliminates unwanted higher frequency signals, such as harmonics of the carrier and its sidebands.

In order to effectively eliminate the adverse influence of the band of spurious components supplied to discriminator 26 along with carrier $f_c$ and its sidebands, an easily identifiable signal component $g$ is introduced into the main spectrum at the time the recording is made, as indicated in FIG. 4F, which component is unrelated to video information. Its frequency is chosen so that the counterpart $g'$ thereof in the band of spurious components falls in the baseband below the lower modulation sidebands of carrier $f_c$ as shown in FIG. 4G. With this component added into the main spectrum, the signal supplied to discriminator 26 in the presence of duty factor error has the spectrum of FIG. 4G. The two components $g$ and $g'$ are always present if there is duty factor error and they may be separated to accomplish elimination or at least partial cancellation of the band of spurious components. For example, the component g is selected from the output of discriminator detector 26 by a frequency selective filter 28 while the component g' is selected from the input to clipper 25 through another filter 29. In other words, filters 28 and 29 constitute means for deriving component g and its counterpart g' in the band of spurious components for application to a synchronous detector 30, the output of which is an error signal which has a polarity as well as an amplitude determined by the counterpart component g'. That component may be shown to vary in polarity and amplitude with duty factor error whereas the phase and amplitude of component g are independent of duty factor error. The means responsive to these components for effectively eliminating the band of spurious components from the output signal of the photoreceptor includes a controllable gain amplifier 31 to which the error signal from synchronous detector 30 is supplied and through which a signal of appropriate polarity, strength and waveform is added to the input of clipper 25 to at least partially cancel at that point the band of spurious components. Since the spectrum of the band of spurious components is triangular in shape, as explained above, it may be simulated by means of a wave shaper 32 that operates on the band of video frequency components in the detected output of discriminator 26 to develop the annulling or cancelling signal. The wave shaper may be an RC differentiating network.

In operation, whenever the playback apparatus experiences duty factor error, synchronous detector 30, driven by component g taken from the output of FM detector 26, develops an error signal having a polarity and amplitude reflecting the sense and magnitude of duty factor change or modulation. The resulting error signal controls the sign and magnitude of gain of amplifier 31 which accordingly feeds back to the input of clipper 25 a compensating or cancellation signal which subtracts and therefore eliminates the band of spurious components that the duty factor modulation has caused to be developed in the reading of the disc.

As discussed above, a separate pilot component g may be introduced into the main spectrum for use in cancelling the spurious components but it is also possible to employ components otherwise present in the spectrum but unrelated, at least to a first order approximation, to video information. For example, the fundamental of the line scanning synchronizing signal may probably be employed to fulfill the role of pilot component g.

While there has been described particular embodiments of the present invention, it is apparent that changes and modifications may be made therein without departing from the invention in the broader aspects. The aim of the appended claims, therefore, is to cover all such changes and modifications as fall within the true spirit and scope of the invention.

What is claimed is:

1. In an optical playback system for reading out information stored in the form of a track on a video record, which track comprises a succession of alternating pits and lands, said pits and lands collectively constituting a spatial representation of a carrier signal having a frequency less than twice the highest video frequency and frequency modulated by a baseband signal comprising a band of video components and another component unrelated to video information and having a frequency less than the lowest frequency in the modulated spectrum, said pits and lands being further representative, under a condition of duty factor error, of a band of spurious components related to said video components and of a counterpart component related to said other component and overlapping a lower sideband of said carrier signal, an arrangement for effectively eliminating said band of spurious components comprising:

photodetector means responsive to a reading of said record track with a beam of light energy for developing an output signal representative of said modulated carrier signal and also representative of said band of said spurious components, when duty factor error is present;

means coupled to the output of said photodetector means for deriving said counterpart component;

detector means coupled to the output of said photodetector means for demodulating said carrier signal;

a frequency selector coupled to the output of said detector for deriving said other component;

a synchronous detector responsive to said counterpart component and to said other component for developing an error signal having a polarity and amplitude proportional to duty factor error;

wave shaping means coupled to the output of said detector for altering the configuration of a portion of said detected baseband signal to simulate said band of spurious components;

controllable gain means responsive to said error signal and to said simulated signal for developing a feedback signal having a polarity and amplitude effective to cancel said band of spurious components; and means for coupling said feedback signal to the output of said photoreceptor means to substantially eliminate said spurious components from said output signal.

2. An arrangement in accordance with claim 1 in which the spectrum of said band of spurious components is substantially a differentiation of said band of video components, and in which said wave shaping means comprises a differentiating network.

* * * * *